(12) United States Patent
Battlogg

(10) Patent No.: US 10,794,103 B2
(45) Date of Patent: Oct. 6, 2020

(54) DOOR COMPONENT COMPRISING A CONTROLLABLE DAMPING SYSTEM

(71) Applicant: INVENTUS ENGINEERING GMBH, St. Anton I. M. (AT)

(72) Inventor: Stefan Battlogg, St. Anton I.M. (AT)

(73) Assignee: INVENTUS Engineering GmbH, St. Anton i.M. (AT)

( * ) Notice: Subject to any disclaimer, the term of this patent is extended or adjusted under 35 U.S.C. 154(b) by 97 days.

(21) Appl. No.: 15/775,679

(22) PCT Filed: Nov. 11, 2016

(86) PCT No.: PCT/EP2016/077474
§ 371 (c)(1),
(2) Date: Aug. 22, 2018

(87) PCT Pub. No.: WO2017/081280
PCT Pub. Date: May 18, 2017

(65) Prior Publication Data
US 2018/0363355 A1      Dec. 20, 2018

(30) Foreign Application Priority Data

Nov. 11, 2015   (DE) .................... 10 2015 119 505
Jul. 21, 2016   (WO) ................ PCT/EP2016/067472

(51) Int. Cl.
*E05C 17/00*      (2006.01)
*E05F 5/02*       (2006.01)
(Continued)

(52) U.S. Cl.
CPC ............ *E05F 5/025* (2013.01); *E05C 17/003* (2013.01); *E05C 17/006* (2013.01); *E05F 15/00* (2013.01);
(Continued)

(58) Field of Classification Search
CPC ........... E05Y 2900/531; E05Y 2201/21; E05B 2047/0033; E05F 5/00; E05F 5/025;
(Continued)

(56) References Cited

U.S. PATENT DOCUMENTS 5,152,189 A * 10/1992 Miura .................... F16F 9/145
464/180
5,468,042 A * 11/1995 Heinrichs ............. E05C 17/305
16/51

(Continued)

FOREIGN PATENT DOCUMENTS

DE         19514610 A1   11/1995
DE         19947203 A1    4/2001
(Continued)

*Primary Examiner* — Justin B Rephann
(74) *Attorney, Agent, or Firm* — Laurence A. Greenberg; Werner H. Stemer; Ralph E. Locher

(57) ABSTRACT

A door component has a damper device with two connection units that can be moved relative to each other for damping a door movement of a door of a vehicle. The damper device contains a magnetorheological fluid, as an operating fluid, and a cylinder unit having a first chamber and a second chamber. The two chambers are separated from each other by a piston which is provided with a damping valve. The damper device has a connection which is constructed for coupling to a drive. The damper device can be moved in an active manner at least from a first position into a second position by the drive which is coupled via the connection.

18 Claims, 4 Drawing Sheets

(51) Int. Cl.
*F16F 9/53* (2006.01)
*F16D 57/00* (2006.01)
*F16F 9/06* (2006.01)
*F16F 9/18* (2006.01)
*E05F 15/00* (2015.01)
*E05F 15/619* (2015.01)

(52) U.S. Cl.
CPC .......... *E05F 15/619* (2015.01); *F16D 57/002* (2013.01); *F16F 9/067* (2013.01); *F16F 9/187* (2013.01); *F16F 9/535* (2013.01); *E05Y 2201/21* (2013.01); *E05Y 2201/254* (2013.01); *E05Y 2201/264* (2013.01); *E05Y 2400/21* (2013.01); *E05Y 2900/531* (2013.01)

(58) Field of Classification Search
CPC ...... E05F 15/619; E05F 15/00; E05C 17/003; E05C 17/006; F16F 9/535; F16F 9/56; F16D 71/00; F16D 71/06
See application file for complete search history.

(56) References Cited

U.S. PATENT DOCUMENTS

| | | | |
|---|---|---|---|
| 5,632,361 A * | 5/1997 | Wulff | F16F 9/3405 188/267 |
| 6,314,612 B1 * | 11/2001 | Rennecke | E05D 11/1028 16/54 |
| 7,097,212 B2 * | 8/2006 | Willats | E05B 51/02 292/1 |
| 8,910,963 B2 | 12/2014 | Battlogg et al. | |
| 9,879,454 B2 | 1/2018 | Bendel et al. | |
| 2001/0033086 A1 * | 10/2001 | Yuge | B60J 5/106 296/56 |
| 2002/0130002 A1 * | 9/2002 | Hopkins | F16F 9/067 188/267.2 |
| 2003/0136626 A1 * | 7/2003 | Ciaramitaro | F16D 37/02 192/57 |
| 2008/0294314 A1 * | 11/2008 | Morris | E05F 5/00 701/49 |
| 2008/0307711 A1 * | 12/2008 | Kern | E05C 17/305 49/501 |
| 2009/0007489 A1 | 1/2009 | Kern et al. | |
| 2010/0019514 A1 | 1/2010 | Steinwender | |

FOREIGN PATENT DOCUMENTS

| | | |
|---|---|---|
| DE | 102004061687 A1 | 7/2006 |
| DE | 102012024376 A1 | 6/2014 |
| EP | 2703686 A2 | 3/2014 |
| WO | 2004001170 A1 | 12/2003 |

* cited by examiner

DOOR COMPONENT COMPRISING A CONTROLLABLE DAMPING SYSTEM

BACKGROUND OF THE INVENTION

Field of the Invention

The present invention relates to a door component having a controllable damper device in particular for a motor vehicle. In this instance, the door component comprises two connection units which can be moved relative to each other and whose relative movement in relation to each other can be braked by means of at least one controllable damper device. In this instance, one of the two connection units can be or is connected to a carrier construction and the other of the two connection units can be or is connected to a pivotable door.

In the prior art, extremely different door components have become known, by means of which a selective damping of the door movement and in particular also selective fixing of the door in predetermined angular positions are possible. In most cases, there are used for this purpose mechanical systems which are cost-effective and which enable the door of a motor vehicle to be fixed in two or three angular positions. It is thereby possible for the user to move the door into one of the angular positions which as a result of the current space situation appears appropriate and can then leave the vehicle.

However, the disadvantage of these known mechanical systems is that the door is fixed in only a specific number of defined angular positions. If there is less or more space currently available, there may be no appropriate adjustment. Furthermore, the door is fixed in only a relatively weak manner and can be opened further with slightly more force which may be disadvantageous if another motor vehicle which is not intended to be damaged is located relatively close beside the door.

Systems are also known which, for example, have a magnetorheological brake and in which an electrical coil produces a magnetic field in order to achieve the desired damping. Consequently, the door can be fixed in a sufficiently powerful manner in order, for example, to provide exit assistance. In order to apply the necessary brake force, however, the system is large and heavy and costly with the result that it has not become widespread.

Active systems have also become known, in which the door can in principle be braked in any desired position or fixed. However, a disadvantage of systems which are, for example activated with a spindle and an electric motor is that they require a relatively large amount of time for opening or closing the door and are loud. Such slow opening and in particular closing operations are not accepted by the user.

BRIEF SUMMARY OF THE INVENTION

An object of the present invention is therefore to provide an improved door component.

This object is achieved with a door component having the features as claimed. Preferred developments of the invention are set out in the dependent claims. Preferred features, developments and embodiments are explained in the general description and the description of the embodiments.

A door component according to the invention comprises a damper device having two connection units which can be moved relative to each other for damping a door movement of a door in particular of a motor vehicle. The damper device contains a magnetorheological fluid as an operating fluid and comprises a cylinder unit having a first chamber and a second chamber, wherein the two chambers are separated from each other by a piston unit which is provided with a damping valve. The damper device comprises a connection device which is constructed for coupling to a drive device. The damper device (and consequently the door component) can be actively moved at least from a first position into a second position by means of the drive device which can be coupled.

In particular, a door component according to the invention comprises at least one damper device having two connection units which can be moved relative to each other for damping a door movement of a door of a vehicle. The damper device contains a magnetorheological fluid as an operating fluid and a cylinder unit having a first chamber and a second chamber. The two chambers are separated from each other by means of a piston unit which is provided with at least one damping valve. The piston unit can be moved at least from a first position into at least a second position or can be moved from a first position relative to the cylinder unit into a second position relative to the cylinder unit. The damper device comprises a connection device which is constructed for coupling to a drive device. A movement of the piston unit relative to the cylinder unit can be actively supported by means of the drive device which can be coupled at least from the first position into the second position.

The door component according to the invention has many advantages. A considerable advantage of the door component according to the invention involves the damper device being able to be moved in an actively supported manner at least between a first position and a second position. Furthermore, the door component according to the invention is provided with a magnetorheological fluid as an operating fluid and can therefore apply a significant braking force so that the door can be fixed in any desired positions in such a manner that the door can be used as an exit assistance.

The damper device or the piston unit of the damper device can be moved in an actively supported manner. This means that the piston unit can be moved relative to the cylinder unit in a controlled manner or, however, that a movement of the piston unit is supported in order to adjust the necessary force in a defined manner or in order to support the movement in a selective manner. An automatic movement is not then (initially) carried out.

The term actively (supported) in the context of the present invention means (supported) in a controllable or controlled manner. Able to be moved actively from a first position into a second position by means of a drive device means that the drive device can move the damper device and in particular a door or the like from a first position into the second position. The user does not have to apply the (full) force to move the door. The full force or the majority of the force required (in particular >30% or >50% or >80%, preferably >95% of the required force) is applied by the drive device.

It is possible and preferable for the force which is required to move the door and in particular the piston unit to be adjusted in a selective manner. In particular, the force required by the user to move the piston unit or the door (referred to below as the "activation force" is adjusted or regulated in a controlled manner and/or within predefined or selectable limits. The activation force can in this instance preferably always be adjusted in the same manner regardless of the (changing) external conditions. The activation force can thus in the event of an inclined position on a slope be adjusted in precisely the same manner as on a level surface. It is possible for there to be provided at least one position sensor which detects an orientation relative to the horizontal.

A current wind load in the opening and/or closing direction can also be taken into account.

The drive device is preferably controlled by the control device in such a manner that, in the actively supported variant, an (almost) identical activation force always has to be applied in order to open and/or close the door. The activation force when opening (and/or closing) is preferably adjusted in a range of +/−50% and in particular +/−25% and preferably +/−10% or more. The user then always has the same level of effort to open (or to close) the door, regardless of whether the vehicle is on a slope and the door would normally open itself or whether the door would fall into a closed position by itself since the door has to be opened (closed) counter to gravitational force. In order to determine the required support, the force acting as a result of external conditions can be established continuously or periodically. With a position of the piston unit (or the door) which is known by means of a position sensor, the movement force required for movement can be retrieved from a store and the movement force established and from that the required support force can be derived in order to obtain the desired activation force. The supporting force may be positive or negative. This means that the door movement in an oblique position can be braked or actively supported.

The level of activation force may be adjustable. It is possible to have, for example, 10 N or 20 N or 30 N or 50 N or 60 N on the door handle or another appropriate value.

In embodiments in which a predetermined movement force is adjusted, an automatic opening or closure does not generally take place. However, it is then also possible to carry out an automatic movement of the door, for example, on request or when a switch or an operating surface is activated, etcetera. It is thus possible for a generally identical activation force to be adjusted and for the door to be automatically opened or closed on request.

A door in the context of the present invention is also considered to be a tailgate or other hatch for closing a storage space or the like. The term door movement therefore also includes in the context of the present invention a hatch movement or an engine hood or tailgate movement. In particular, the damper device is constructed as a linear damper. Preferably, one of the two connection units can be connected to a carrier construction and the other of the two connection units can be connected to a movable door device in particular of a motor vehicle. In preferred embodiments, the first position is a closure position and the second position is an open position. However, it is also possible for the first position to be a slightly open position and for the second position to define a further opened position.

In a particularly preferred manner, a door or the like can be actively opened.

Preferably, the damper device can be moved in an active (supported) manner from the second position into the first position. In particular, the damper device can be moved actively from the second position into the first position by means of the drive device which can be coupled. It is preferable for the damper device to be able to be moved back and forth with the drive device actively at least partially between the first and second position. Preferably, one door can be moved both in the opening direction and in the closure direction. It is possible and preferable for the damper device not to be moved actively completely into the first position in order to prevent jamming. Then, it may be possible that the user further has to transmit a signal for the complete closure of the door or for the closure to be carried out more slowly or for the user simply to completely close the door himself.

In preferred embodiments, the damper device comprises an air chamber which is operationally connected to the piston unit. In particular, the connection device comprises at least one fluid connection with respect to the air chamber. A fluid connection to an air chamber enables many possibilities since via the fluid connection the air pressure in the air chamber can be changed. Since the air chamber is operationally connected to the piston unit, it is consequently possible in a simple manner for the damper device to be moved from the first into the second position in an active, quiet and rapid manner and where applicable also actively moved back from the second position into the first position again.

The air chamber may in particular also be constructed as a compensation chamber for a volume of a piston rod of the piston unit, which volume is introduced into the cylinder unit. In specific preferred embodiments, the piston unit comprises substantially or at least to a significant extent the piston and a piston rod which is connected thereto and which extends outward from the cylinder unit. The piston which is arranged in the cylinder unit divides the volume (or a considerable or the largest volume proportion) of the cylinder unit into a first chamber and a second chamber. If the piston rod extends, for example, through the first chamber, the volume taken up by the piston rod thus increases as the piston rod is introduced. The compensation chamber may adjoin the second chamber via the partition piston. If the piston rod is now introduced further into the cylinder unit, the volume of the compensation chamber and consequently the air chamber is compressed.

If the air chamber is placed under a higher pressure by means of the connection device, there is produced on the piston of the piston unit a force which urges the piston unit in the deployed direction. It is thereby possible to carry out an automatic opening of a door. If the door is now intended to be fixed at a particular angular position, the damping valve may be acted on by a magnetic field so that the flow channel which is arranged therein for the magnetorheological fluid is acted on with a magnetic field, whereby a sufficiently powerful braking of a movement of the two connection units with respect to each other can be applied. The braking or retention force which can be applied is also sufficient to fix the damper device or a door as an exit assistance means. If a door is fixed as an exit assistance means, an occupant can hold onto it with his full weight and pull himself out of the car without the door opening further. Damage to the door and/or adjacent motor vehicles or objects can thereby be prevented to the greatest possible extent.

As a result of a subsequent discharge of the pressure from the air chamber, the force for deploying the piston rod can be reduced accordingly. If the piston rod is preloaded by another pneumatic spring or by means of a differently constructed spring, such as a helical spring or the like, in the retracted position, an active movement of the door or hatch or the like or the damper device from the second position into the first position can also be carried out.

The compensation chamber is preferably separated from the first or the second chamber by means of a compensation piston.

In preferred embodiments, a pump and/or a controllable valve is/are associated with the damper device. The pump and/or the controllable valve is/are preferably connected to the connection device. Furthermore, the pressure in the air chamber can be increased or decreased.

Preferably, at least one pressure store is associated with the damper device. Such a pressure store is used in this instance as an energy store so that an opening of the door or a movement of the damper device between the first position and the second position or between the second position and the first position can also be driven by the gas volume stored in the pressure store. In a particularly preferred manner, the pressure store can be charged by the vehicle. The pressure store may be provided on the vehicle and using the on-board units can be kept at a defined pressure level or in a specific pressure range. It is also possible for a pressure store to be directly associated with the door component or contained therein and for this pressure store to be charged by means of a pump (compressor) which is provided in the door component or associated with the door component.

In all embodiments, it is possible and preferable for the damper device to be preloaded by means of at least one resilient device into one of the two positions. It is also possible for there to be provided two or more different resilient devices which preload the damper device in different directions. It is thus possible, for example, in the first position for a preloading to be carried out in the direction of the second position, and in the second position a preloading of the damper device can act in the direction of the first position.

Preferably, the damper device can be moved with the drive device counter to a resilient force of the resilient device in the direction of the other position. In a particularly preferred manner, the damper device can be moved with the drive device from the first position into the second position and also from the second position into the first position.

In all embodiments and developments, it is possible for the connection device to comprise at least one drive device which is constructed as a motor or for a device which is constructed as a motor to be associated with the connection device. Such a motor may in particular be able to be driven electrically. It is also possible and preferable for the motor to be able to be driven hydraulically or pneumatically or in a piezoelectric manner. It is also possible for a magnetic drive to be provided.

An electric motor may, for example, be used to drive a pump or a compressor. It is also possible for an electric motor to act on a spindle which, for example, moves an adjustment piston and consequently, for example, acts on the pressure in the air chamber.

It is preferable for the motor to be coupled to the damper device by means of a converter. In this instance, the converter may in particular convert a rotational movement of the motor into a longitudinal movement of the damper device.

In a simple embodiment, the converter comprises a toothed rod and a toothed wheel which meshes therewith. It is also possible for the converter to comprise a belt or a chain or the like.

It is also possible for an adjustment piston to be acted on hydraulically in order to change the pressure in the air chamber. Hydraulic fluid may also be directed into a flexible element (or pumped out of it) in order to change the air pressure in the air chamber. For example, a flexible element such as a rubber bellows may be arranged in the air chamber or be adjacent thereto or connected thereto. Then, a volume change of the rubber bellows brings about a volume change of the air chamber and consequently a pressure change in the air chamber. The connection device then provides at least one hydraulic connection. The supply with the hydraulic fluid can be carried out centrally via the motor vehicle. The hydraulic unit of the motor vehicle can be used as a drive device.

The drive device may also have a solenoid. Via such a magnet, a spacing on the damper device can also be influenced or adjusted. Furthermore, an active movement of the damper device from the first position into the second position or vice versa can be carried out. In this instance, it is also possible for an active solenoid to influence the volume of the air chamber or an air chamber, and consequently to influence the internal pressure therein, in order to bring about an opening and/or closing of a door of the motor vehicle.

A solenoid may have a pair of cooperating magnet units, wherein one magnet unit is connected to the piston unit and the other magnet unit is connected, for example, to the cylinder unit. In this instance, a first of the two magnet units may be constructed as an electromagnet and the second magnet unit may be constructed as a permanent magnet or as an electromagnet or may comprise magnetic material. If the electromagnet is acted on with electrical power, it attracts the magnetic material. If a permanent magnet is used as magnetic material, depending on the polarity an attraction force or a repellent force may be produced, whereby a greater travel is enabled.

In all embodiments, it is possible for the motor to be coupled to a piston rod of the damper device.

Preferably, the damper device or the damping valve of the damper device comprises at least one flow channel through which a magnetorheological fluid can flow, wherein the flow channel can be subjected to a variable magnetic field of a magnetic field source. By producing a corresponding magnetic field, the flow resistance of the flow channel can be changed and consequently a damping of the damper device can be influenced and adjusted by the magnetic field in the flow channel.

The invention provides a door component for motor vehicles, in which the door can be opened in a rapid and quiet manner with a harmonious movement. In addition, the door can be stopped on different (lateral) obstacles with extremely different spacings. The stop function is produced by means of a magnetorheological damper device, which can be readily opened in the powerless state (for example, in the event of an accident). In the closed state or in the closed position, the damping valve is preferably not supplied with power. In the closed position, the door or door component is preferably retained by means of a locking unit. The locking unit can be unlocked by activating the door lock or, for example, electrically.

Mechanically, such a damper device may have a separation piston which is acted on with gas or air in order to compensate for the piston rod volume. As a result of the pretensioning of the piston rod by the compensation volume of a compensation chamber which is divided by the separation piston (may also directly be an air chamber), the piston rod is independently deployed with a force defined by the pressure of the compensation chamber. Depending on the pretensioning pressure (air pressure in the air chamber which is, for example, constructed as a compensation chamber) and depending on the door kinematics, the door consequently opens independently when the damper device or the damping valve of the damper device is not acted on with a magnetic field (and becomes or is unlocked). When the door is opened, the opening speed can be adapted by means of a current setting of the damping valve. Furthermore, the door can be completely stopped in any desired angular position by applying a correspondingly high magnetic field and fixed at that location.

The system or the position of the separating piston may also be mounted in a transposed manner so that the piston rod is independently retracted. Depending on the pretensioning pressure in the air chamber which is constructed as a compensation chamber, a corresponding damping force can be produced when the door is opened.

In another variant, a one-way circuit is provided for the magnetorheological fluid for the damper device. In such an embodiment, the compensation chamber is located at the low-pressure side with the compensation volume for a piston rod which is introduced into the cylinder unit both when opening and closing so that only a small pretensioning force is present. Then, the complete damping force can be produced in both movement directions (pulling and pressure side when opening and closing). As a result of a selective increase of the air pressure in the air chamber (and/or compensation chamber), a deployment (and retraction) can be produced. To this end, the pressure can be adapted accordingly. In all embodiments, the compensation chamber can act directly as an air chamber. By means of air supply to the air chamber or air discharge from the air chamber, the air pressure in the compensation chamber can be adjusted. It is also possible for the compensation chamber and the air chamber to be constructed as separate chambers and to interact with each other by means of a movable wall (flexible wall or also adjustment piston) or the like.

Independent opening of the door component can be carried out whilst at the same time a manual closure or automatic closure is carried out.

In a preferred embodiment, the door may open independently and is closed by hand. In this instance, a force difference is to be anticipated since, for rapid opening (possibly in a slightly oblique position), more force is required than is readily applied by the user during closing. The smaller the closure force becomes, the more pleasant the closing operation, but the greater the force difference also is.

This force difference is preferably provided by the drive device. The force difference does not have to be produced in real time as required, but instead can be stored in an intermediate manner and called for only as required. It is, for example, possible to use air in the air chamber or also a mechanical spring as an energy store. This has advantages since the actuator can be smaller. Furthermore, the systems are mechanically decoupled or are coupled by means of a soft element such as a spring.

It is an advantage in terms of comfort when the user does not have to open the door when standing laterally with respect to the door, but instead when the door is already pre-opened and he can virtually climb directly in.

In all embodiments, there can be provided near-field sensors which identify the environment and limit the opening angle of the door in such a manner that the risk of a collision is minimized. Collisions can be completely prevented.

In all embodiments, there may be provided sensors which identify an object between the door and the bodywork during closure and which limit the opening angle of the door in such a manner that the risk of squashing/injury/damage is minimized.

According to another variant, the damper device comprises a continuous piston rod which extends through the first chamber and through the second chamber. The first chamber and/or the second chamber may then be adjoined by (at least) one air chamber (or an air chamber at each of the two ends), in which, for example, one (or in each case one) of the piston rods protrudes. As a result of the fact that the piston rod extends completely through the first chamber and the second chamber, the system is in principle initially powerless. The piston rod now protrudes slightly into the air chamber so that, when the piston rod is introduced further into the air chamber, the air present at that location is compressed by the introduced volume of the piston rod so that a restoring force is applied.

In such a variant, when the damper device is introduced or when the door is closed, a pretensioning of the air chamber is carried out so that automatic opening of the door is enabled. It is also possible for the movement in one direction or the other to be supported to a greater extent by a mechanical spring such as a helical spring or a plate spring or the like. It is also possible for in (at least) one movement direction a pneumatic spring to be provided in the form of an air chamber and in the other movement direction for a mechanical spring or also an air chamber to be present. As a result of a variation of the air pressure in the air chamber (or both air chambers if one is present at both ends), the resilient strength of the pneumatic spring(s) can be varied so that by means of simple variation of the air pressure in the air chamber (the air chambers) both a retraction and a deployment of the damper device are enabled.

In all embodiments, it is possible that, in order to facilitate a force-intensive retraction of the damper device (closure of the door), the air pressure in the air chamber after the door is opened is reduced to a low pressure. As a result, comfortable closure of the door is subsequently enabled with little force or even automatic closure of the door. After closing the door or moving the damper device into the first position, the pressure level in the air chamber of the damper device can again using a pump or a compressor be brought to the starting level. Afterwards, a subsequent opening in comfort is possible again. In different embodiments, it is also possible to produce the basic restoring force with a mechanical spring, wherein the pump can then be operated at a lower pressure.

In other embodiments, it is also possible to introduce a force pulse or a force by means of a magnet into the system. Then, the damper device may, for example, be moved into the second position (open position) when a solenoid is activated and supports a movement of the damper device into the second position.

In other embodiments, it is again possible, for example, via an adjustment piston or the like to vary a volume of the air chamber so that the pressure within the air chamber is changed accordingly. Such an adjustment piston may, for example, be moved by means of a motor with a spindle drive in a rapid and simple manner. It is thus possible for different pressures to be produced in the air chamber or the compensation chamber, whereby corresponding forces can be produced.

Other advantages and features of the present invention will be appreciated from the embodiments which are explained below with reference to the appended Figures.

BRIEF DESCRIPTION OF THE SEVERAL
VIEWS OF THE DRAWING

DESCRIPTION OF THE INVENTION

Figure 1:
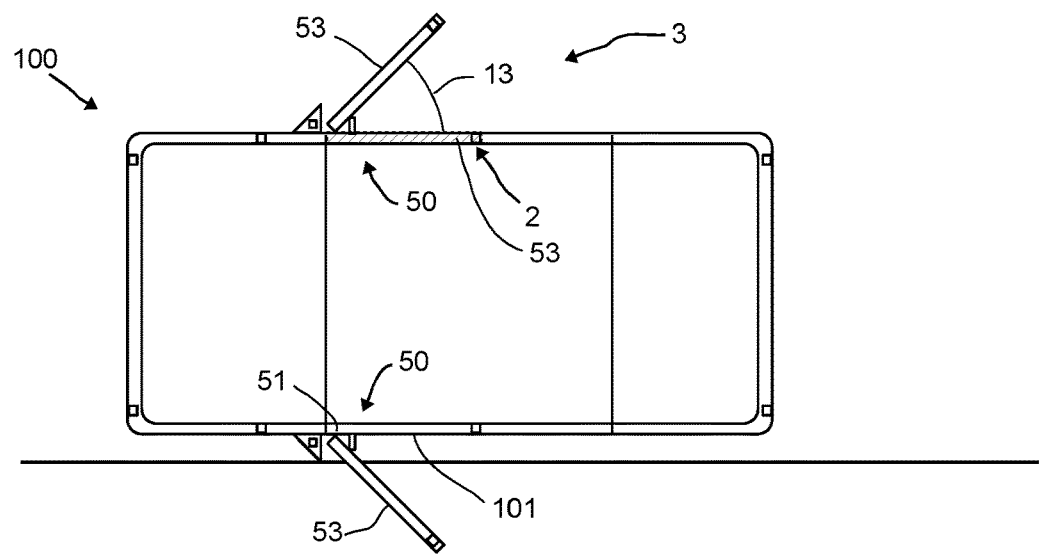
FIG. 1 is a schematic plan view of a motor vehicle having a door component according to the invention.

FIG. 1 is a schematic plan view of a motor vehicle 100 which is stopping at the edge of a road and in which in this instance there are provided two door devices 53 which are constructed as doors and which are both open. The doors 53 are each located approximately in an angular position 13. The doors are each part of a door component 50 which in this instance comprises the doors 53. It is equally possible for a door to be fitted to the door component 50. The door component 50 in any case comprises connection units 51 and 52 (cf. FIG. 2) for connection to the carrier construction 101 of the vehicle 100 or to the door 53 in order to receive the door in a pivotable manner on the carrier construction 101. In this instance, the door may comprise a plurality of units which are each pivotable and which are connected to each other in an articulated manner. The door may be pivotably received on one or two or more pivot axes. Illustrated with shading is a door 53 in the closed position 2 in which the door terminates in this instance flush with the vehicle.

Figure 2:
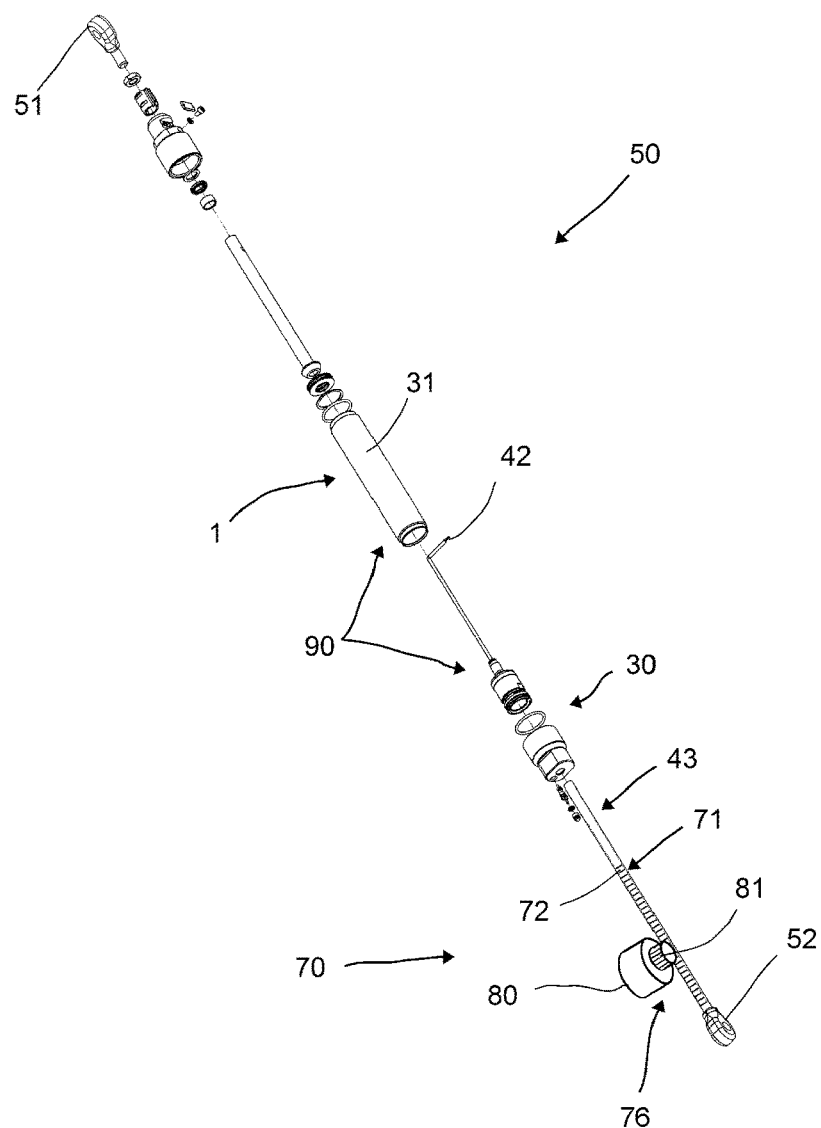
FIG. 2 is a schematic exploded view of the door component according to FIG. 1.

FIG. 2 shows as an enlarged illustration an exploded view of the door component 50, wherein the door component 50 comprises a damper device 1 which has a magnetorheologically based damper.

The door component 50 in FIG. 2 has connection units 51 and 52 for connection to the carrier construction 101 and the door 53. A defined and controlled pivoting of the door when moving from the open position illustrated in FIG. 1 to the closed position 2 also illustrated in FIG. 1 is possible.

The damper device 1 comprises a piston/cylinder unit 90 having a cylinder unit 31 and a piston unit 30. The piston 38 of the piston unit 30 divides the cylinder volume 32 in a variable manner into a first chamber 33 and a second chamber 34 (cf., for example, FIG. 3). A compensation volume 36 of a compensation chamber 37 serves to compensate for the piston rod 43 which is introduced into the cylinder unit 31.

A connection device 71 is formed at the end of the piston rod 43. The connection device 71 comprises in this instance a tooth arrangement or a toothed rod 72 which is constructed in this instance on the piston rod 43. Furthermore, there is provided a drive device 70 which in this instance comprises an electric motor 80 with a toothed wheel 81. The toothed wheel 81 meshes with the toothed rod 72 on the piston rod 43. The teeth of the toothed rod 72 begin with such a spacing from the piston 38 of the piston unit that the desired travel can be carried out. In particular, the piston rod may also be constructed to be longer than illustrated in FIG. 2 in order to enable adequate travel and adequate length of the toothed rod 72.

Via the drive device 70, the piston unit 30 can be introduced into or accordingly removed from the damper device 1 in a manner controlled by the control device 4. The toothed wheel 81 and the toothed rod 72 act as gear mechanisms so that the motor 80 can be rotated at a correspondingly high rotation speed in order to achieve the desired movement speed.

Figure 3:
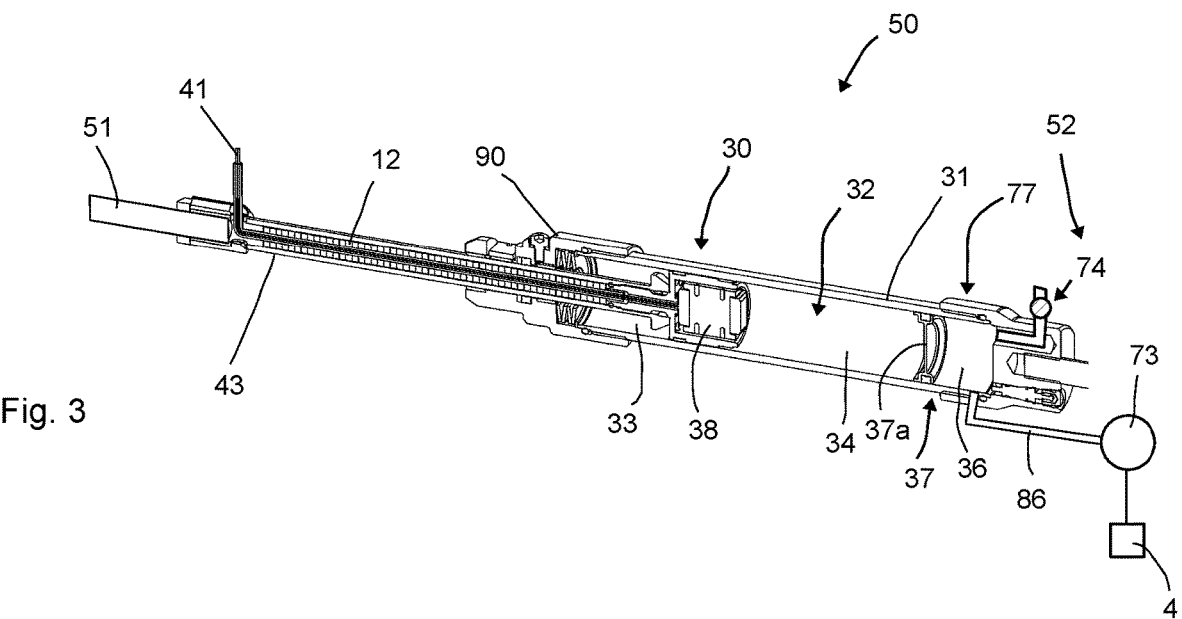
FIG. 3 is an enlarged cross-section of the door component according to FIG. 1.

FIG. 3 is an enlarged cross-sectional illustration of a portion of the door component 50 from FIG. 2, wherein in this instance a different drive device is schematically illustrated, but also a drive on the piston rod (or on the cylinder unit 30) as may be implemented in FIG. 2.

In the damper device 1 which is illustrated in cross-section in FIG. 3 it is possible to see on the piston/cylinder unit 90 the piston unit 30 with the piston 38 in which the magnet device 9 is arranged with the electric coil 10. The piston 38 divides the cylinder volume 32 of the cylinder unit 31 into a first chamber 33 and a second chamber 34. The damping valve 5 is arranged on the piston 38.

In the cylinder unit 31, the compensation device is illustrated with the compensation chamber 37 and the compensation volume 36. The compensation chamber 37 is separated from the second chamber 34 by a separation piston or compensation piston 37a which slides in a variable manner inside the cylinder unit 31. It is also possible for the compensation chamber 37 to be placed at the other side, wherein a sealing with respect to the continuous piston rod and the first chamber 33 has to be carried out. The compensation chamber 37 is filled with a gaseous medium and in this instance with air under a relatively low pressure. The introduction volume of the piston rod 43 can be compensated for.

In this instance, the compensation chamber 37 is constructed as an air chamber 77 and further has an air line as a fluid line 86. The fluid line acts as a connection device 71 or is part of the connection device 71. The air line leads to a pump 73 which is driven by means of a motor 80. The pump is controlled by means of the control device 4. Via the pump 73, the internal pressure in the air chamber 77 can be selectively increased in order to bring about a deployment of the piston unit 30. In order to return to a lower pressure again from the high pressure, there is provided a switchable valve 74 by means of which air can be discharged from the air chamber 77, for example, into the environment or an (intermediate) store.

The damping valve 5 is connected to a power supply and the control device 4 by means of connection cables 41.

The damper device 1 from FIGS. 2 and 3 may selectively be moved in an active manner by means of an adjustment of the pressure in the air chamber 77. It is also possible to provide an external motor which, for example, via a toothed wheel and a toothed rod actively retracts or deploys the damper device.

Figure 4:
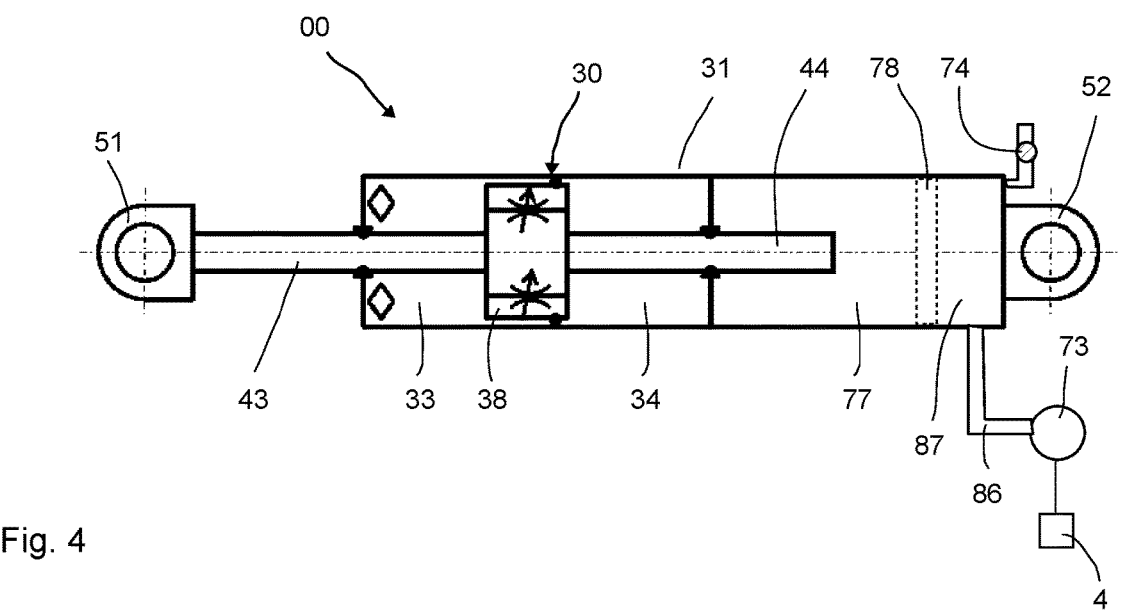
FIG. 4 shows another embodiment of a door component according to the invention.

FIG. 4 shows a variant in which a continuous piston rod or in which two piston rods 43, 44 is/are provided. The inner side of the cylinder unit 31 is divided by the piston 38 into two chambers 33 and 34 again. In this instance, the two piston rods 43 and 44 at the respective ends are guided outward from the first and second chamber, respectively. Whilst the first piston rod is guided completely outward, the second piston rod 44 enters the air chamber 77 here so that at the entrance of the piston rod 44 into the air chamber 77 the volume available for the air is reduced and consequently the internal pressure in the air chamber 77 is increased. As a result of the pump 73 or the valve 74, the pressure inside the air chamber 77 can be selectively increased or decreased in order to be able to bring about a selective deployment of the piston unit 30. The provision of a separate air chamber for "active" enables better functional configuration than, for example, in the construction according to FIG. 3, where the air chamber has a dual function (active and pressure support in the retraction direction).

Illustrated with dashed lines is another variant having a control piston 78 which then separates a control chamber 87 which can be acted on via the fluid line 86 with air or a hydraulic fluid in order to adjust the volume of the air chamber and the pressure in the air chamber.

Figure 5:
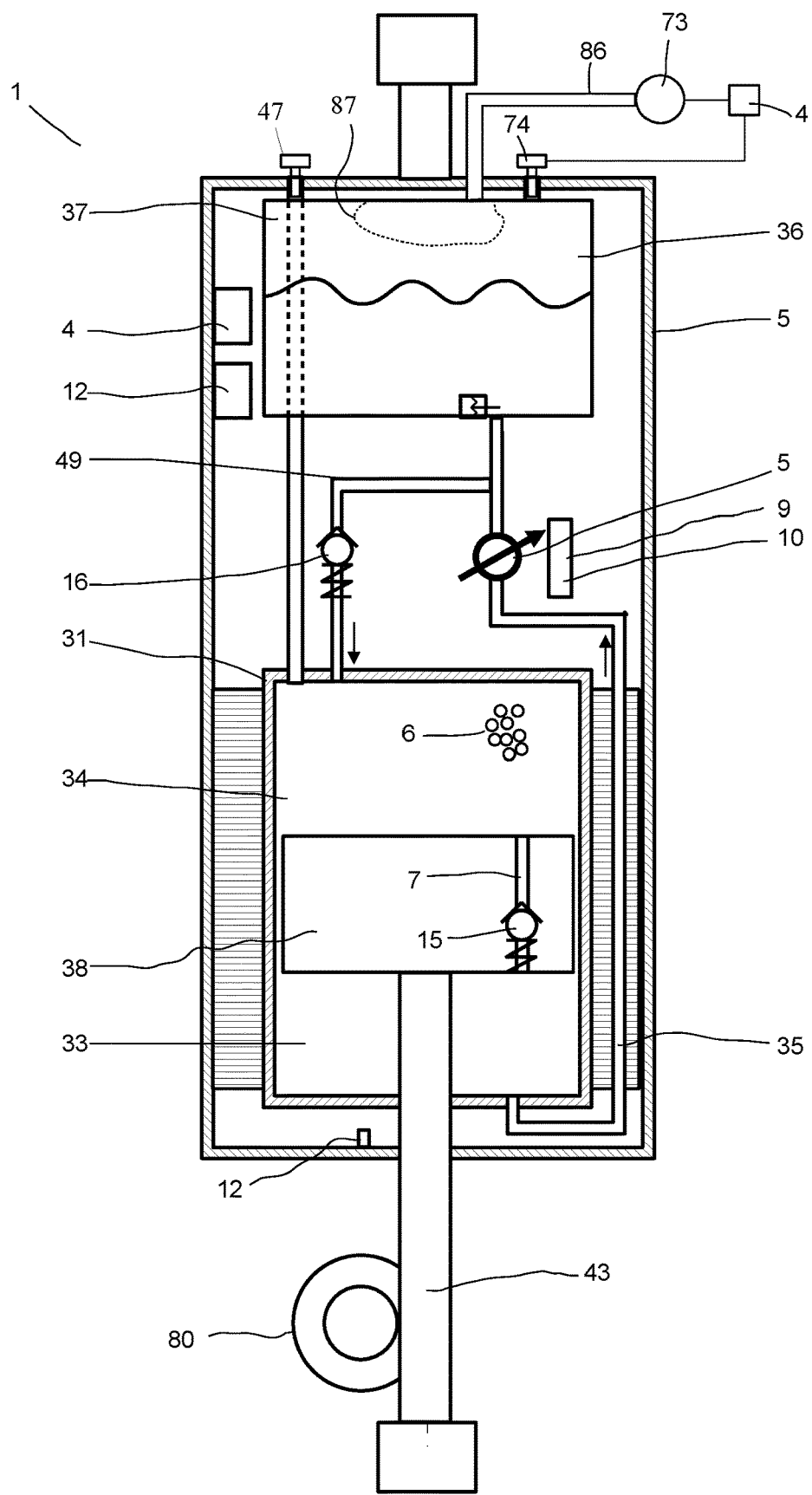
FIG. 5 shows another embodiment of a door component according to the invention.

FIG. 5 shows another schematically illustrated variant of a damper device 1 of a door component 50 having connection units 51 and 52. The damper device has a magnetorheological fluid 6 as operating fluid. A piston unit 30 having a piston 38 separates a first chamber 33 from the second chamber 34. At least one flow channel 7 leads through the piston. There is provided in the flow channel 7 a one-way valve 15 which enables flow of the magnetorheological fluid only from the second chamber 34 into the first chamber 33. From there, the operating fluid is directed through the return channel 35 to the in this instance external damping valve 5 with which a magnet device 9 and an electric coil 10 are associated in order to adjust the desired damping. The damping valve 5 is in turn connected in terms of flow via a line 49 and a second one-way valve 16 to the second chamber 34. Both when the piston rod 43 is immersed in the cylinder unit 31 and when the piston rod 43 is removed from the cylinder unit 31, the operating fluid 6 flows in the same direction in accordance with the arrows which are drawn. Depending on whether the piston rod is introduced or removed, magnetorheological fluid is directed to the compensation chamber 37 or magnetorheological fluid is removed from the compensation chamber 37. In the compensation chamber 37, a compensation volume 36 which is filled with a gas is provided.

One or more sensor devices 12 may be provided in order to detect a relative position of the two connection units 51 and 52 with respect to each other in order to derive therefrom an angular position of the door 53. However, it is also possible in all embodiments for other angle sensors to be provided, for example, on the rotary joint, so that an angular position is directly output.

In this instance, an electric coil 10 is also used to produce a magnetic field.

The motor 80 acts on the piston rod 43. In this instance, there may be formed on the piston rod 43 a tooth arrangement or a toothed rod 72 which meshes with a toothed wheel 81 of the motor 80. In this instance, the compensation volume 36 may also be acted on with more or less pressure, whereby as a result of piston surface differences an "active" deployment (or also retraction, depending on the construction) of the piston rod is produced, as also described with reference to the embodiments according to FIGS. 3 and 4. The air line as a fluid line 86 then acts as a connection device 71 for connection to a compressor 73 (which may be driven by means of a motor 80). Via the valve which can be controlled with the control device 4, the pressure can be reduced.

Illustrated with dashed lines is a flexible bellows as a control chamber 87 which can be acted on via the fluid line with air or a hydraulic fluid. By introducing fluid, the volume of the control chamber 87 is increased and by discharging it is reduced, whereby a corresponding pressure is adjusted in the compensation chamber 37 in each case.

Figure 6:
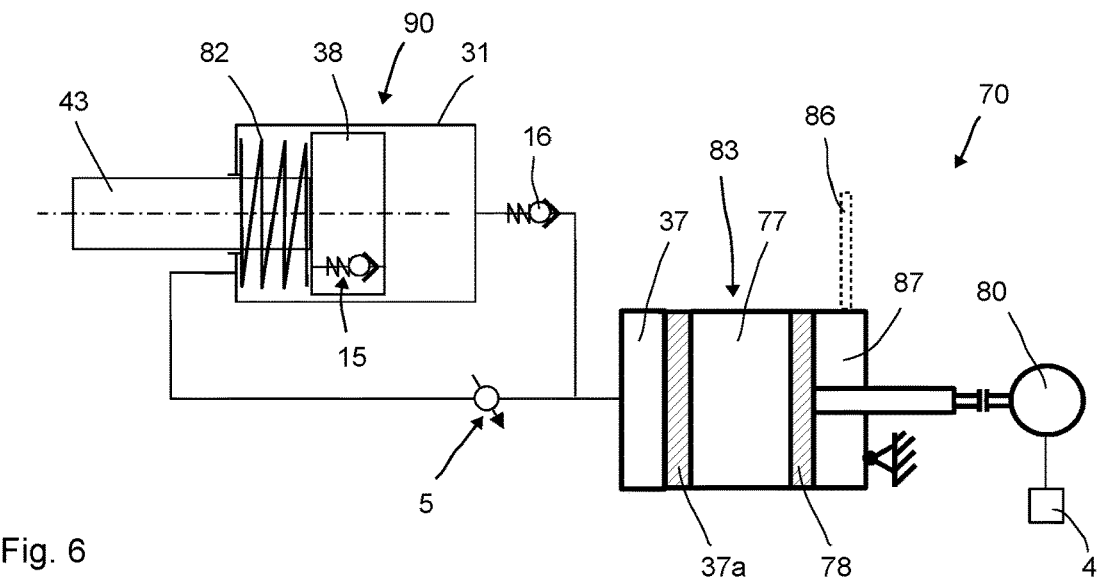
FIG. 6 shows a variant of the door component according to FIG. 5.

FIG. 6 is a schematic illustration of a variant of the damper device 1 from FIG. 5, wherein in this instance there is additionally drawn a resilient device 82 which preloads the piston unit 30 into the retracted position. Furthermore, in the compensation chamber 37 there is drawn a compensation piston 37a which separates the compensation chamber 37 from an air chamber 77. The air chamber 77 is in turn delimited at the other side by an adjustment piston 78. The adjustment piston 78 may be moved in a controlled manner by means of a lifting/spindle drive and the electric motor 80 via the control device 4 in order to further retract or deploy the adjustment piston 78. The volume of the air chamber 77 which acts as a resilient device 83 is thereby varied. If the adjustment piston 78 is retracted further, the air chamber 77 is compressed and the pressure on the compensation piston 37a is increased, whereby the force of the resilient device 82 can be overcome and the piston unit 30 can be deployed from the cylinder unit 31. Conversely, if the volume of the air chamber 77 is increased by the adjustment piston 78 being retracted, the pressure acting on the compensation chamber 37 is accordingly reduced and the piston unit 30 is moved from the deployed open position into the closed position.

In a corresponding manner, with the other embodiments illustrated above, the volume of the air chamber 77 can also be varied in order to achieve a selective retraction or deployment of the piston rod.

Illustrated with dashed lines is a fluid line 86 which in this instance acts as a hydraulic line and is provided where applicable. In such embodiments, the motor and the spindle can be omitted. The fluid line 86 can be connected to a (local or central) hydraulic unit and be used to supply and discharge hydraulic fluid to/from the control chamber 87. Via the supply and discharge of hydraulic fluid to/from the chamber 87, the position of a movable wall, such as, for example, the adjustment piston 78, can be influenced and consequently the pressure in the air chamber can be adjusted. In this and all other embodiments, the air chamber does not have to contain air, but instead can contain any gases. It is also possible for the hydraulic fluid to be directed into a flexible bellows which during supply reduces the volume in the air chamber and consequently increases the air pressure. It is also possible for the movable wall or the adjustment piston to act on a spring, such as a helical spring.

Figure 7:
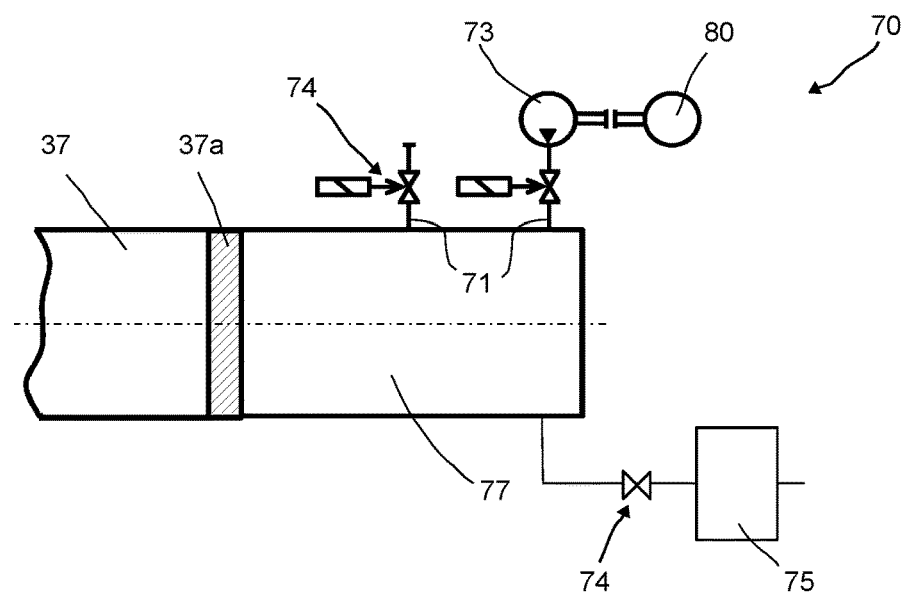
FIG. 7 shows a variant of the door component according to FIG. 6.
Figure 8:
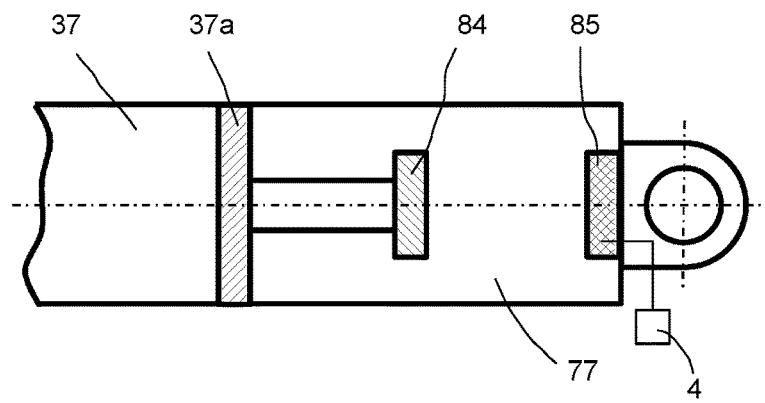
FIG. 8 shows another variant of the door component according to FIG. 6.

FIGS. 7 and 8 show variants which can be produced in principle in all previous embodiments. In this instance, the air chamber 77 is adjacent to the compensation piston 37a of the compensation chamber 37. In FIG. 7, a pump 73 which is driven by means of an electric motor 80 is connected via fluid connections as a connection device 71 to the air chamber 77. Via the pump 73, the air pressure in the air chamber 77 can be accordingly increased, whilst air can also be discharged externally via the controllable valve 74.

FIG. 8 finally shows a variant in which a magnetic material or a permanent magnet 84 is connected, for example, to the compensation piston 37a. The permanent magnet 84 cooperates with a solenoid 85 which in this instance is arranged on the connection unit 52. By activating the magnetic field of the solenoid 85, the magnetic material or the permanent magnet 84 is attracted (or repelled). A low-wear adjustment of the first position and the second position can thus be carried out.

On the whole, the invention provides an advantageous door component in which a blocking of a door is enabled in any position. At the same time, the door can be opened and/or closed by means of a drive device 70, whereby the comfort is increased. During the opening or closing operation, it is possible to stop the movement operation at any time, for example, when an obstacle is identified, in order to prevent damage or injury.

In all embodiments, the force required to move the door and in particular the piston unit 30 can be selectively adjusted. The activation force required by the user is then controlled and adjusted in a predefined range. The activation force is always adjusted in an identical manner regardless of the changing external circumstances. On a slope, the same activation force then has to be applied as in the event of wind from the front or rear. In order to determine the orientation, there is preferably provided a position sensor which detects an orientation relative to the horizontal in the longitudinal and transverse direction. Sensors may also take into account a current wind load. The drive device is then controlled by the control device 4 in such a manner that an (almost) identical activation force always has to be applied by the user in order to open and/or close the door. The control/regulation of the activation force can also take place only during the opening operation. During the closure operation, the movement can be damped in such a manner that a full closure takes place. The user then always has the same effort during opening, regardless of whether the car is on a slope or not. The support force may be positive or negative so that a support or braking force can be applied. The present invention can also be used for a rear hatch, an engine hood or a loading hatch on other devices and in particular on motor vehicles. In the context of the present invention, such hatches or hoods are also door components or comprise such a component.

LIST OF REFERENCE NUMERALS

1 Damper device
2 First position, closed position
3 Second position, open position
4 Control device
5 Damping valve
6 MRF
7 Flow channel
8 Magnetic field
9 Magnet device
10 Electric coil
11 Electric coil
12 Sensor device
13 Angular position
14 Predetermined angular position
15 First one-way valve
16 Second one-way valve
18 Magnetic pulse
19 Period of time
20 Changing speed
21 Delay
22 Rotation speed
23 Limit value of 20
24 Lower damping
25 Greater damping
26 Maximum damping
27 Damping
28 Closure speed
29 Second compensation channel
30 Piston unit
31 Cylinder unit
32 Cylinder volume
33 First chamber
34 Second chamber
35 Rear channel
36 Compensation volume
37 Compensation chamber
37a Compensation piston
38 Piston
39 Compensation device
40 Electrical connection unit
41 Connection cable
42 Slot
43 First piston rod
44 Second piston rod
45 Diameter of 43
46 Pipe
47 Valve
48 Valve
49 Line
50 Door component
51 Connection unit
52 Connection unit
53 Door
54 Angular position
60 Obstacle
70 Drive device
71 Connection device
72 Toothed rod
73 Pump
74 Valve
75 Pressure store
76 Converter
77 Air chamber
78 Adjustment piston
80 Motor
81 Toothed wheel
82 Resilient device
83 Resilient device
84 Permanent magnet
85 Solenoid
86 Fluid line
87 Control chamber
90 Piston/cylinder unit
100 Vehicle
101 Carrier construction

The invention claimed is:

1. A door component, comprising:
a damper device having two connection units that are movable relative to one another for damping a movement of a door of a vehicle;
said damper device including a cylinder unit with a first chamber and a second chamber;
a piston separating said first and second chambers from one another and being movable between a first position and a second position, said piston having a damping valve;
a drive and a connection device configured for coupling said piston to said drive, said drive being configured to actively assist in a movement of said piston relative to said cylinder unit at least from the first position into the second position;
said damper device being formed with an air chamber that is operationally connected to said piston, and said connection device including a fluid connection at said air chamber.

2. The door component according to claim 1, wherein said drive is configured to actively support the movement of said piston so that, regardless of an orientation of the vehicle, the same activation force is required to move said piston.

3. The door component according to claim 1, wherein said damper device can be actively moved from the second position into the first position.

4. The door component according to claim 1, wherein the second position represents an open position of the vehicle door and the first position represents a closed position of the vehicle door.

5. The door component according to claim 1, wherein said air chamber is a compensation chamber for a volume of a piston rod of said piston to be introduced into said cylinder unit.

6. The door component according to claim 5, comprising a compensation piston disposed to separate said compensation chamber from said first or second chambers.

7. The door component according to claim 1, which comprises at least one of a pump or a controllable valve associated with said damper device and connected to said connection device.

8. The door component according to claim 1, which comprises at least one pressure reservoir associated with said damper device.

9. The door component according to claim 8, wherein said pressure reservoir is to be charged by the vehicle.

10. The door component according to claim 1, which comprises a resilient device disposed to preload said damper device into one of the first or second positions.

11. The door component according to claim 10, wherein said drive is configured to move said damper device counter to a resilient force of said resilient device in a direction toward another position.

12. The door component according to claim 1, wherein said drive is a motor.

13. The door component according to claim 12, wherein said motor is a device to be driven electrically, hydraulically, pneumatically or piezoelectrically.

14. The door component according to claim 12, comprising a converter coupling said motor to said damper device, said converter converting a rotary movement into a translatory movement.

15. The door component according to claim 14, wherein said converter comprises a toothed rod and a toothed wheel disposed to mesh with said toothed rod.

16. The door component according to claim 12, wherein said motor is coupled to a piston rod of said damper device.

17. The door component according to claim 1, wherein said drive comprises a solenoid.

18. The door component according to claim 1, which further comprises:
- a magnetorheological fluid forming an operating fluid in said damper device;
- said damper device being formed with a flow channel through which the magnetorheological fluid flows;
- a magnetic field source configured to subject said flow channel to a variable magnetic field so as to influence a flow resistance of said flow channel and consequently a damping of said damper device.

* * * * *